3,170,762
MANUFACTURE OF MAGNESIUM HYDROXIDE
Carmela Ben-Ari, Ramat Gan, and Warren J. Fuchs, Mount Carmel, Haifa, Israel, assignors to Negev Phosphates Limited, Hakirya, Israel
No Drawing. Filed Oct. 2, 1961, Ser. No. 142,008
Claims priority, application Israel, Oct. 12, 1960, 14,490/60; Dec. 9, 1960, 42,445/60
5 Claims. (Cl. 23—201)

The present invention concerns the production of magnesium hydroxide from brines containing magnesium chloride.

Magnesium hydroxide is required mainly for conversion into magnesium oxide which latter is needed, i.e., in the manufacture of refractories.

In the so-called sea water or brine process for the production of magnesium hydroxide, the latter is precipitated from a brine containing magnesium chloride by means of calcium hydroxide resulting from calcination and subsequent slaking of some natural calcium carbonate ore, e.g. dolomite. While this procedure is economically attractive because of the great abundance and consequential low price of lime, it has the disadvantage that the precipitated magnesium hydroxide is as a rule contaminated by numerous impurities. This makes necessary the application of elaborate purification procedures which are rendered difficult because of the semicolloidal nature of the precipitate.

The invention consists in a process for the production of magnesium hydroxide by precipitation from brines containing magnesium chloride, comprising the steps of reacting the brine with ammonia, separating the resulting magnesium hydroxide precipitate, cycling the mother liquor into contact with lime, recovering ammonia from the resulting calcium chloride solution and recycling the recovered ammonia back into the brine for precipitation of a further quantity of magnesium hydroxide. Complete recovery of ammonia from the calcium chloride solution is best done by heating.

The calcium chloride brine obtained in this process may either be rejected or utilized in any suitable way.

Analysis has shown that the magnesium hydroxide precipitates obtained in accordance with the invention are 99.9% pure.

A magnesium chloride liquor suitable for the purposes of the present invention is, for example, water from the Dead Sea (Israel), because of its high magnesium chloride concentration. However, the invention is in no way limited to this possibility and any other $MgCl_2$ brine may be used, provided it does not contain ions whose hydroxides are less water soluble than $Mg(OH)_2$.

Thus in accordance with the invention the exchange of the $Cl^-$ ions of the magnesium chloride brine for $OH^-$ ions supplied by the calcium hydroxide takes place indirectly with the aid of a closed $NH_3$—$NH_4Cl$ cycle without the brine and the lime ever coming into mutual contact. Rather than that the brine and the lime are kept in separate vessels in one of which occurs the reaction

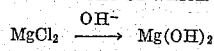
$$MgCl_2 \xrightarrow{OH^-} Mg(OH)_2$$

while in the other the reaction

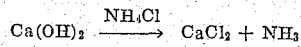
$$Ca(OH)_2 \xrightarrow{NH_4Cl} CaCl_2 + NH_3$$

takes place. The $OH^-$ ions are supplied to the first vessel by the ammonia recycled from the second one while the $Cl^-$ ions required in the second vessel are supplied by the ammonium chloride recycled from the first one. Figuratively speaking, the ammonia thus serves as a selective carrier which delivers to the brine the required hydroxyl ions while leaving behind all impurities accompanying the lime.

Therefore, practically any available lime source may be used for the process according to the invention, irrespective of its degree of purity and the nature of the accompanying minerals. Thus, for example, bituminous limestone may be used. This possibility is economically attractive since the off-the-mine mineral already contains the fuel necessary for calcination so that no external source of energy is required. Another example of a source of limestone which may be utilized in accordance with the present invention is the $CaCO_3$-phosphate mixture being the rejects of phosphate beneficiation operations.

The latter possibility is of considerable practical importance as it enables to combine the production of magnesium hydroxide in accordance with the invention with the beneficiation of calcareous rock phosphate. The beneficiation procedure concerned is of the kind wherein the rock phosphate, which may be the run-of-the-mine ore or a produced concentrate by any known method, e.g. flotation, is calcined for conversion of the calcium carbonate contained in the ore into quicklime, the calcined mass is wet-slaked for the conversion of the quicklime into calcium hydroxide, and the latter is removed from the phosphate.

By wet-slaking the calcine mass, i.e., slaking with the aid of an amount of water in excess over that required for hydration, the resulting calcium hydroxide is slurried in the excess water. Upon separation of this slurry from the phosphate residue, e.g., by decantation, the calcium hydroxide carries off an appreciable amount of phosphate which cannot be retrieved in an economically satisfactory way by known methods and is given up as lost. In conventional wet-slaking rock phosphate upgrading processes, the $P_2O_5$ recovery is thus apt to be as low as 60 to 70%, that is 30 to 40% of the rock phosphate are lost.

The present invention provides for an integrated process in which the calcium hydroxide slurry resulting from wet-slaking of calcined calcareous rock phosphate is combined with the production of magnesium hydroxide. The calcium hydroxide is in this manner converted into water soluble $CaCl_2$ leaving behind it as residue the entrained phosphate which may be easily separated and is thus retrieved.

Therefore one embodiment of the invention consists in an integrated process for the production of magnesium hydroxide and upgrading of calcareous phosphate ore comprising the basic steps of calcining the ore, wet-slaking the calcined ore and separating from the slaked mass a calcium hydroxide slurry carrying with it some amount of phosphate, which process is characterized in that the separated slurry is treated with ammonium chloride for producing an aqueous solution of calcium chloride and ammonia in mixture with solid phosphate, the solution is separated from the solid phosphate, ammonia is recovered from the solution and introduced into an aqueous magnesium chloride brine, thereby producing a magnesium hydroxide precipitate in mixture with an aqueous ammonium chloride solution, this solution is separated from the magnesium hydroxide precipitate and the ammonium chloride is recycled for reaction with another portion of calcium hydroxide slurry obtained by the wet-slaking of calcined carbonaceous phosphate ore.

The slaking of the calcined ore is preferably performed at boiling temperature.

The separation of the phosphate from the aqueous solution of calcium chloride and ammonia as well as the separation of the magnesium hydroxide precipitate from the aqueous solution of ammonium chloride may be effected by any conventional solid-liquid separation method.

The complete recovery of ammonia from calcium chloride solution is best done by heating.

The above integrated process thus produces pure magnesium hydroxide and at the same time provides for a nearly 100% $P_2O_5$ recovery in the upgrading of calcareous rock phosphate.

As a rule the calcium hydroxide slurry separated from the slaked ore is dilute, and various measures may be taken in order not to encumber the subsequent treatment of the slurry with ammonium chloride and the distillation of ammonia by the handling of too much water. For example, the slurry may be concentrated, e.g., to a solid: liquid ratio of about 1:4 or 1:5, and solid ammonium chloride may be dissolved in the slurry thus concentrated. Or the slurry may be concentrated further, even to dryness or near-dryness, and this concentrate or residue be admixed with an aqueous solution of ammonium chloride.

The invention is illustrated by the following examples to which it is not limited.

Example 1

To 100 ml. of Dead Sea water containing 19.9 g. of $MgCl_2$ was added 100 ml. of a 10% aqueous ammonia solution (64% excess of ammonia). A precipitate of 8.2 g. of $Mg(OH)_2$ was obtained, which was 99.9% pure. After filtration, the mother liquor was reacted with 15 g. of calcined bituminous limestone containing the equivalent of 10.4 g. of $Ca(OH)_2$, which resulted in the immediate expulsion of 4.8 g. of $NH_3$. An additional quantity of 5.2 g. of $NH_3$ was recovered by steaming. The entire amount of recovered ammonia was recycled to the $Mg(OH)_2$ precipitation stage.

It will be appreciated that in practice the process according to the invention is carried out in a continuous manner by continuously feeding ammona and brine into the vessel in which the $Mg(OH)_2$ is precipitated, continuously withdrawing from this vessel $Mg(OH)_2$ and mother liquor, leading the mother liquor continuously into a second vessel where it is reacted with lime, withdrawing continuously from that second vessel the formed $CaCl_2$ brine and continuously adding fresh lime into this vessel. In this manner a continuous $NH_3$—$NH_4Cl$ cycle is formed in which the quantity of $NH_3$ is constant but for operational losses while the reactant spent is lime, similar as in conventional processes.

Example 2

Run-of-the-mine calcareous phosphate ore from Oron (Israel) was concentrated by flotation to yield a concentrate containing 30.9% of $P_2O_5$ and a proportion of calcium carbonate corresponding to 8.47% of $CO_2$ and 10.76% of $CaO$.

1 ton of this concentrate was calcined at about 1000° C. for 2 hours, whereby it lost 80.2 kg. of $CO_2$ (95% $CO_2$-expulsion). The calcined ore was slaked at the boil with 5 tons of water during 20 minutes, then the coarse phosphate was allowed to settle and the supernatant slurry of calcium hydroxide admixed with a smaller proportion of phosphate fines was removed by decantation.

Sample analysis of an aliquot portion of the decantate showed that the total amount of suspended solid matter thus removed amounted to 167 kg., containing 35.9 kg. of $P_2O_5$, being 11.5% of the $P_2O_5$ contents of the rock phosphate concentrate used as a starting material.

The calcium hydroxide-phosphate slurry was concentrated by evaporation to a total volume of about 800 liters. The solid:liquid ratio (weight/weight) was then about 1:4.

180 kg. of solid ammonium chloride, being approximately the stoichiometric equivalent of the calcium hydroxide contained in the slurry, where then introduced into the slurry and the mixture was stirred for 2 hours. The ammonium chloride dissolved and reacted with the calcium hydroxide, whereby a calcium chloride-ammonia solution was formed over a sediment of phosphate. The sediment was separated and amounted to 35 kg. It was re-combined with the upgraded rock phosphate, whereby the $P_2O_5$ recovery was raised to nearly 100%.

From the separated solution the ammonia was distilled off and the distillate introduced into 1200 liters of Dead Sea water whereby a precipitate containing 98 kg. of $Mg(OH)_2$ was formed. The supernatant liquor contained 180 kg. of $NH_4Cl$. The ammonium chloride was used again in the phosphate upgrading process, either as a solid after the evaporation of the aforesaid $NH_4Cl$ solution, or by contacting this solution, possibly somewhat concentrated by evaporation, with a concentrate or solid residue obtained by the complete or near-complete evaporation of the calcium hydroxide-phosphate slurry separated from the slaked phosphate ore.

We claim:

1. A process for the production of magnesium hydroxide comprising continuously feeding an aqueous calcium hydroxide suspension into a first vessel and an aqueous magnesium chloride solution into a second vessel, establishing between the two vessels a closed cycle by continuously flowing gaseous ammonia from said first to said second vessel and continuously flowing an aqueous ammonium chloride solution from said second to said first vessel, continuously discharging an aqueous calcium chloride solution from said first vessel and withdrawing precipitated magnesium hydroxide from said second vessel.

2. A process which comprises calcining a calcareous rock phosphate, wet-slaking the calcined product, separating the resulting aqueous suspension of calcium hydroxide and withdrawing the remaining enriched rock phosphate as a first product; continuously feeding said suspension into a first vessel and a magnesium chloride solution into a second vessel, establishing between the two vessels a closed cycle by continuously flowing gaseous ammonia from said first to said second vessel and continuously flowing an aqueous ammonium chloride solution from said second to said first vessel, continuously discharging an aqueous calcium chloride solution from said first vessel, withdrawing a phosphate containing product from said first vessel as a second product, and withdrawing precipitated magnesium hydroxide from said second vessel as a third product.

3. A process according to claim 2, comprising concentrating said calcium hydroxide suspension prior to feeding the same to said first vessel.

4. A process according to claim 1, comprising heating said first vessel for a complete expulsion of ammonia.

5. A method of producing magnesium hydroxide in a closed cycle process, said method comprising forming first and second reaction zones, reacting in the second reaction zone magnesium chloride and ammonia to yield magnesium hydroxide and ammonium chloride and reacting in the first zone calcium hydroxide and ammonium chloride to yield ammonia and calcium chloride, the ammonium chloride produced in the second reaction zone being fed to the first reaction zone while the ammonia produced in the first reaction zone is fed to the second reaction zone whereby magnesium hydroxide is produced utilizing only magnesium chloride and calcium hydroxide as starting substances.

References Cited by the Examiner

UNITED STATES PATENTS

| | | | |
|---|---|---|---|
| 663,840 | 12/00 | Zitt | 23—201 |
| 1,348,933 | 8/20 | Dolbear | 23—201 |
| 1,910,169 | 5/33 | Kaselitz | 23—201 |
| 1,986,509 | 1/35 | MacIntire | 23—201 |
| 2,603,555 | 7/52 | Hulme | 23—201 |

MAURICE A. BRINDISI, *Primary Examiner.*